United States Patent [19]
Shea et al.

[11] Patent Number: 5,332,497
[45] Date of Patent: Jul. 26, 1994

[54] NOZZLELESS UNDERDRAIN FOR GRANULAR FILTRATION SYSTEM

[75] Inventors: Edward M. Shea; J. Holland Scott, both of Salt Lake City, Utah

[73] Assignee: Baker Hughes Incorporated, Houston, Tex.

[21] Appl. No.: 782,136

[22] Filed: Oct. 25, 1991

[51] Int. Cl.$^5$ .......................... B01D 24/42
[52] U.S. Cl. .................. 210/274; 210/275; 210/279; 210/289; 210/291; 210/293
[58] Field of Search ............... 210/274, 275, 279, 289, 210/291, 293

[56] References Cited

U.S. PATENT DOCUMENTS

| | | |
|---|---|---|
| 1,069,737 | 8/1913 | Stevenson . |
| 1,773,417 | 8/1930 | Whitacre . |
| 1,871,122 | 8/1932 | Kretzschmar . |
| 2,710,692 | 6/1955 | Kegel et al. ............... 210/130 |
| 2,767,852 | 10/1956 | Ellila ......................... 210/171 |
| 3,110,667 | 11/1963 | Stuppy ...................... 219/275 |
| 3,613,888 | 10/1971 | Harris ........................ 210/274 |
| 3,831,761 | 8/1974 | Chantereau ............... 210/274 |
| 3,956,134 | 5/1976 | Sturgill ...................... 210/225 |
| 4,064,050 | 12/1977 | Heaney et al. ............. 210/293 |
| 4,065,391 | 12/1977 | Farabaugh ................. 210/274 |
| 4,118,322 | 10/1978 | Roman ...................... 210/275 |
| 4,196,079 | 4/1980 | Ward .......................... 210/274 |
| 4,214,992 | 7/1980 | Sasano et al. .............. 210/274 |
| 4,331,542 | 5/1982 | Emrie ......................... 210/294 |
| 4,619,765 | 10/1986 | Roberts ..................... 210/293 |
| 5,019,259 | 5/1991 | Hambley ................... 219/274 |
| 5,108,627 | 4/1992 | Berkebile et al. .......... 210/793 |
| 5,156,738 | 10/1992 | Maxson ..................... 210/293 |

FOREIGN PATENT DOCUMENTS

| | | |
|---|---|---|
| 669712 | 1/1939 | Fed. Rep. of Germany . |
| 1153346 | 7/1960 | Fed. Rep. of Germany . |
| 298867 | 12/1954 | Switzerland . |
| 123152 | 2/1919 | United Kingdom . |
| 2002251 | 2/1979 | United Kingdom . |

*Primary Examiner*—Ivars Cintins
*Attorney, Agent, or Firm*—Trask Britt & Rossa

[57] ABSTRACT

A self-supporting modular underdrain member for use in a liquid filtration system comprises a main body or housing including a pair of longitudinally extending inclined walls which may have a pair of generally triangular transverse walls connecting the inclined walls to one another, the inclined walls each being provided with a pair of longitudinally extending recesses and a plurality of orifices communicating with each of the recesses. A pair of flanges are connected to the inclined walls for attaching the underdrain body to a floor surface so that the inclined walls, any transverse walls and the floor surface define a cross-sectionally triangular underdrain chamber. Two pairs of elongate cover plates are attached to the inclined walls over the recesses to form in each of the inclined walls a pair of longitudinally extending plenums for the equalization of backwash air and water flow. Each of the cover plates being provided with a plurality of spaced slots.

39 Claims, 1 Drawing Sheet

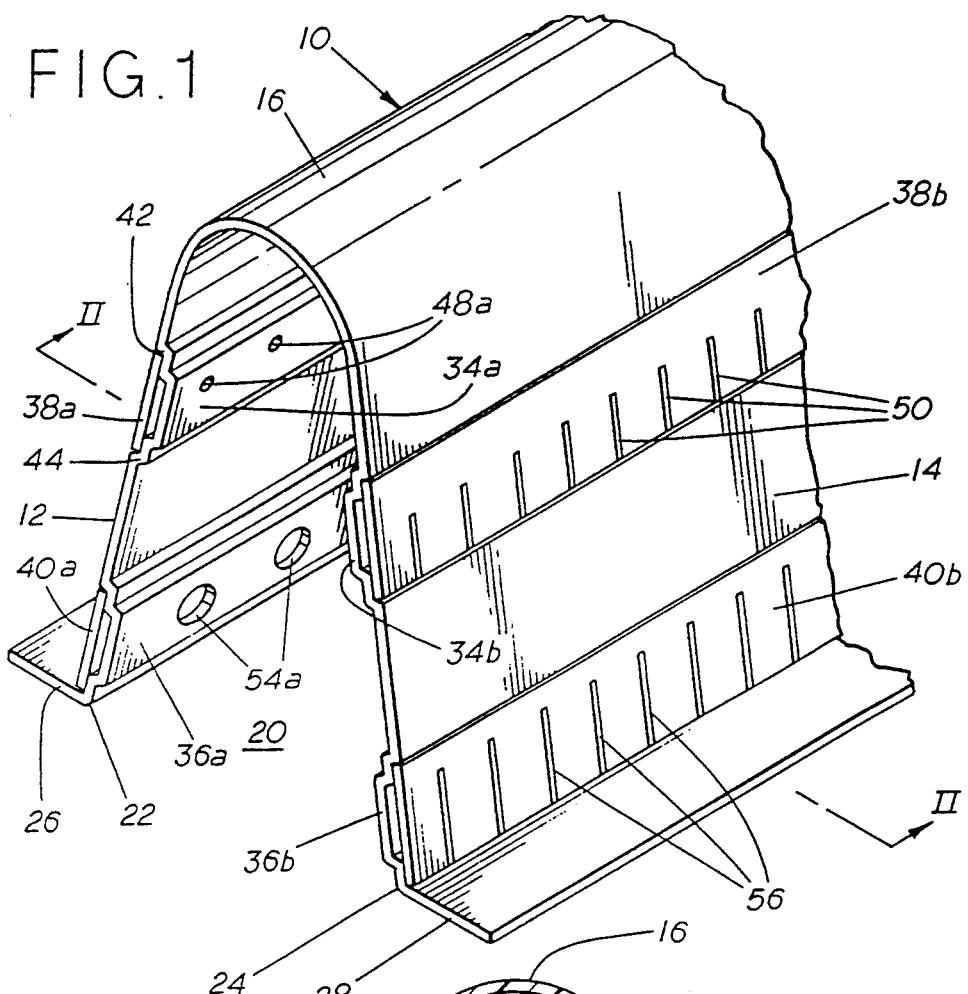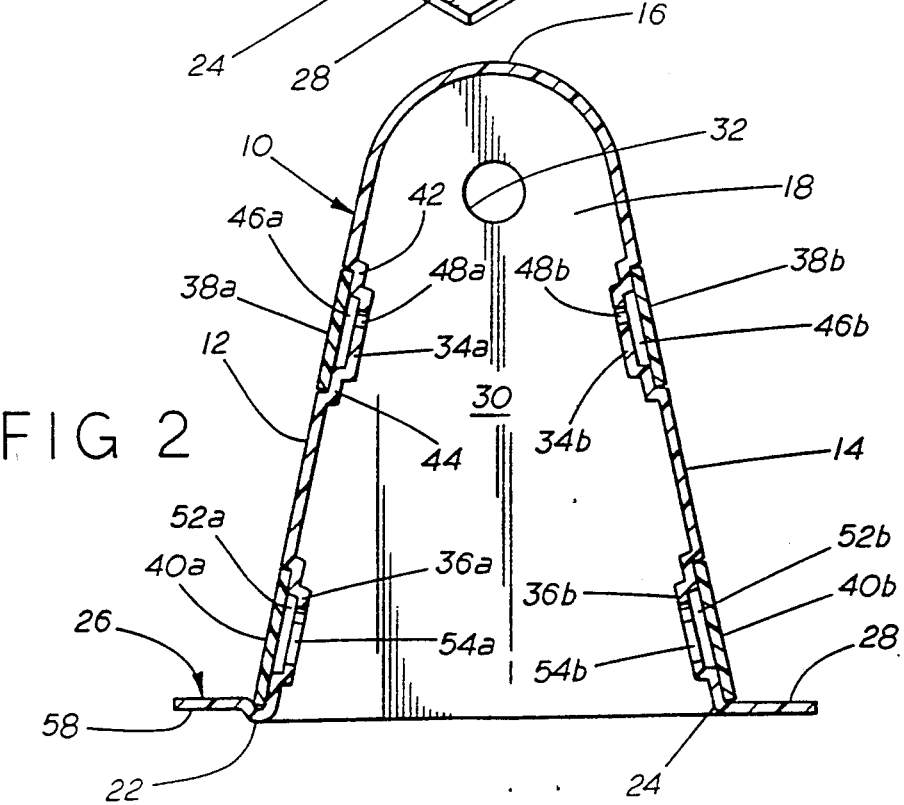

NOZZLELESS UNDERDRAIN FOR GRANULAR FILTRATION SYSTEM

FIELD OF THE INVENTION

This invention relates to an underdrain member for use in a granular filtration system. More particularly, this invention relates to such an underdrain member which is modular and which can be used in the granular media filtration of potable water, process water, or waste water.

BACKGROUND OF THE INVENTION

Gravity filtration systems generally comprise a filter bed of one or more granular filter media. A liquid is filtered by flowing downwardly through the filter media and through openings in a filtration tank or underdrain disposed below the filter media. The gravity filtration system is cleaned by backwashing air and/or water from the filtration tank or underdrain in a direction opposite to the flow of liquid during the filtration process. It is extremely important for the backwash to have an even distribution. A nonuniform backwash flow can fail to clean parts of the filter media and can disrupt the filter bed, which reduces the life of the filtration system.

The only low-cost underdrain currently on the market requires extensive grout work during installation and is therefore fairly difficult to install. There is a need for an underdrain which is inexpensive, easy to install and easily adaptable to different applications.

OBJECTS OF THE INVENTION

An object of the present invention is to provide an underdrain member which provides for an even backwash distribution of water, air, or air and water together in a granular filtration system.

Another object of the present invention is to provide an underdrain member which is easily adapted to filter bays of different sizes.

A further object of the present invention is to provide an underdrain member which is easily attached to a floor surface.

Yet another object of the present invention is to provide an underdrain member which produces an even backwash flow distribution even if the underlying floor surface is not perfectly level.

Another, more particular, object of the present invention is to provide such an underdrain member which distributes both air and water simultaneously during a backwash operation.

A further particular object of the present invention to provide such an underdrain member wherein distribution of air for backwash is completely independent of the distribution of water for backwash.

An additional object of the present invention is to provide an underdrain member which is inexpensive and has reduced installation costs.

SUMMARY OF THE INVENTION

A self-supporting, preferably modular, underdrain member for use in a liquid filtration system comprises, in accordance with the present invention, a main body or housing including a plurality of walls which at least partially define an underdrain chamber, i.e., a chamber which serves to guide an effluent to an outlet during a filtering operation and a backwash fluid from a fluid source during a filter cleaning operation. The backwash fluid may be a liquid such as water or a gas such as or both a liquid and a gas. The underdrain housing is provided with attachment elements for attaching the housing to a floor surface. At least one of the walls of the underdrain housing is provided with a recess, while a cover plate is attached to the one wall over the recess to form a plenum at that wall. The wall with the recess is formed with a plurality of first orifices to establish communication between the underdrain chamber and the plenum, the cover plate being provided with a plurality of second orifices to establish communication between the plenum and a filter-medium-containing space overlying the underdrain member the liquid filtration system. Both the first and second orifices may vary in size and spacing to optimize backwash water distribution.

The main body preferably has an open side juxtaposable to the floor surface so as to define the underdrain chamber therewith.

The plenum in an underdrain member in accordance with the present invention defines a secondary air or water distribution channel. Particularly in the case that the channel is used in the distribution of air during a backwash operation, the orifices may be provided in different sizes and with different spacings to optimize the equalization of air pressure in the plenum and thereby equalize the backwash flow from the plenum through the second orifices.

Pursuant to a particular feature of the present invention, the second orifices take the form of slots. Preferably, the cover plate is an elongate member and the slots each extend transversely with respect to the cover plate. Also, the slots may vary in size and may be sized small enough to prevent the passage of fine filter media grains such as sand though the cover plate. In this case, gravel may be eliminated from the filtration system. Pursuant to another feature of the present invention, the slots may be tapered.

In accordance with a specific embodiment of the present invention, the housing includes two inclined walls, each of the inclined walls being provided with a plurality of substantially parallel elongate recesses and a like plurality of elongate cover plates each attached to the respective inclined wall over a respective one of the recesses to thereby form a plurality of elongate plenums at each of the inclined walls. One plenum in each wall is above the other plenum in that wall and serves as an air distribution channel. The lower plenum serves as a water distribution channel. Each of the inclined walls is formed with a plurality of first orifices to establish communication between the underdrain chamber and the plenums in the respective wall. Each of the cover plates is provided with a plurality of second orifices to establish communication between the respective plenum and a filter-medium-containing space of the liquid filtration system. As discussed hereinabove, the second orifices preferably take the form of slots. In addition, the orifices between the underdrain chamber and the upper plenums are relatively small, while the orifices between the underdrain chamber and the lower plenums are relatively large.

Pursuant to another feature of the present invention, the attachment elements include a first flange and a second flange, the first flange defining a recess for matingly receiving the second flange of another underdrain in the filtration system.

In accordance with another conceptualization of the present invention, a self-supporting underdrain in a liquid filtration system comprises a primary body or housing including a plurality of walls which at least partially define a primary underdrain chamber for guiding an effluent to an outlet during a filtering operation and a backwash liquid and/or gas from a back-wash source or sources during a cleaning operation. Attachment elements are provided for attaching the primary body to a floor surface. A secondary body is connected to the primary body of the underdrain for defining a secondary chamber communicating via a plurality of orifices with the primary chamber, the orifices being disposed in a first wall of the primary body and the secondary body. The secondary body is provided with a plurality of spaced slots in a second wall different from and spaced from the first wall to enable backwash fluid entering the secondary chamber from the primary chamber to exit the secondary chamber to a filter-medium-containing space overlying the underdrain member in the liquid filtration system.

As discussed hereinabove, the first wall is provided with a recess, while the secondary body and the second wall comprise an elongate plate provided with the spaced slots. The elongate plate is attached to the first wall to cover the recess and thereby form the secondary chamber. As further discussed above, the slots may be small enough to prevent the passage of filter media grains though the cover plate.

In accordance with yet another conceptualization of the present invention, a self-supporting underdrain member for use in a liquid filtration system comprises a main body or housing having a plurality of walls which at least partially define a primary underdrain chamber for guiding an effluent to an outlet during a filtering operation and a backwash liquid and/or gas from a backwash source or sources during a cleaning operation, attachment elements being provided for attaching the main body to the floor surface. A closure is connected to the main body for defining along at least one of the walls a secondary chamber or plenum having a second volume substantially smaller than the first volume. The wall bearing the closure is provided with a plurality of first orifices to enable communication between the primary chamber and the secondary chamber, the closure being provided with a plurality of second orifices to enable communication between the secondary chamber and a filter-media-containing space overlying the underdrain member in the liquid filtration system. The orifices preferably take the form of slots as described above.

The secondary chamber or plenum generally has a volume less than one tenth the size of the primary chamber. The secondary chamber may even be less than one percent the size of the primary chamber. It is to be noted, however, that the pressure equalization function of the secondary chamber may be accomplished to some degree at even larger sizes of the secondary chamber, perhaps when that chamber is as large as a quarter of the size of the primary chamber.

An underdrain member in accordance with the present invention is designed to be a fully functional granular media filter underdrain capable of air scouring the media above it without the use of filter nozzles. Instead, traditional layers of gravel may be laid above the underdrain to keep the filter media out of the underdrain or, alternatively, a slot size may be used which will exclude the filter media from the underdrain.

An underdrain member in accordance with the present invention provides for an even backwash distribution in a granular filtration system. The underdrain member is easily adapted to filter bays of different sizes and is easily attached to a floor surface. The underdrain member produces an even back-wash flow distribution even if the underlying floor surface is not perfectly level.

The underdrain member may be bolted directly to a reasonably level filter floor. A false floor or plenum is not required, only a gullet or piping to bring air and water into the underdrain chamber or filter bay.

The underdrain member is modular and can be easily mounted to a floor surface together with other similar modular underdrain members. The mating connector flanges facilitate the use of multiple underdrain members and thereby enable adaptation of the underdrain to filtration systems of different capacities.

The orifices and slots of the underdrain member may be provided, in accordance with the present invention, with different sizes and different spacings or densities to achieve optimal distribution of air and water for backwashing as well as control of the flow of filtered effluent. The slotted strips or cover plates of the underdrain member aid in both evenly distributing the backwash flows and excluding media or gravel.

An underdrain member in accordance with the present invention distributes both air and water simultaneously during a backwash operation and the distribution of air for backwash is completely independent of the distribution of water for backwash.

The underdrain member has the further advantages of being inexpensive and having reduced installation costs.

BRIEF DESCRIPTION OF THE DRAWING

FIG. 1 is a partial isometric view of a modular underdrain member for use in a granular filtration system in accordance with the present invention, a transverse end wall being removed for illustration purposes.

FIG. 2 is a transverse cross-sectional view taken in the direction of arrow II in FIG. 1, showing a slight modification of the design of FIG. 1.

DETAILED DESCRIPTION

As illustrated in the drawing, a modular nozzleless underdrain member comprises a main body or housing 10 which includes a pair of oppositely inclined, longitudinally extending side walls 12 and 14 connected to one another via a bight portion or upper wall 16 having a cross-section in the form of an inverted U. Housing or body 10 further includes a pair of generally triangular, transversely extending end walls 18 (only one end wall shown in the drawings). Each end wall 18 is connected or bonded to side walls 12 and 14 and bight portion 16.

Housing or body 10 has, on an underside, an opening 20 flanked by side walls 12 and 14. Side walls 12 and 14 are provided along their longitudinally extending lower edges 22 and 24 with respective outwardly extending horizontal flanges 26 and 28. Flanges 26 and 28 are each traversed by a respective plurality of spaced bolts (not shown) for attaching the modular underdrain to a floor surface to form a cross-sectionally triangular primary underdrain chamber 30. As in conventional underdrains, chamber 30 serves to guide an effluent to an outlet (not shown) during a filtering operation and a backwash liquid and/or gas from a back-wash source or sources (not shown) during a cleaning operation. As shown in FIG. 2, an end wall 18 may be provided with an aperture 32 for coupling the underdrain member to a source of pressurized air or pressurized air may be introduced from below. Opening 20 may be used for coupling the underdrain member to a source of water.

Each side wall 12 and 14 is formed with a longitudinally extending upper recess wall 34a and 34b and a longitudinally extending lower recess wall 36a and 36b. The upper recess walls or regions 34a and 34b each receive a respective elongate cover plate 38a and 38b. Lower recess walls or regions 36a and 36b also receive respective cover plates 40a and 40b. Each recess wall 34a, 34b and 36a, 36b is provided with a pair of longitudinally extending shoulders 42 and 44 for seating the respective elongate recess cover plate 38a, 38b, 40a, or 40b.

Upper recess walls 34a and 34b and associated cover plates 38a and 38b define a pair of secondary chambers, plenums, or channels 46a and 46b for forming air blankets to equalize air pressure during a backwash operation. Plenums 46a and 46b are pressurized by air from primary underdrain chamber 30, chamber 30 communicating with plenums 46a and 46b via ports or orifices 48a and 48b spaced longitudinally along inclined side walls 12 and 14.

During a backwash operation, air flows from plenums 46a and 46b through respective pluralities of slots 50 formed in upper cover plates 38a and 38b. Slots 50 extend parallel to one another and transversely to the respective cover plate 38a and 38b. Slots 50 may be sufficiently narrow to prevent the passage of filter media particles through cover plates 38a and 38b. Preferably, the slots are slightly tapered.

Lower recess walls or regions 36a and 36b and associated cover plates 40a and 40b define two secondary chambers, plenums, or channels 52a and 52b for equalizing water flow during a backwash operation. Water flows into plenums 52a and 52b from primary underdrain chamber 30 via ports or orifices 54a and 54b spaced longitudinally along inclined side walls 12 and 14.

During a backwash operation, water flows from plenums 52a and 52b through respective pluralities of slots 56 formed in lower cover plates 40a and 40b. Slots 56 extend parallel to one another and transversely to the respective cover plate 40a and 40b. Slots 56 may be sufficiently narrow to prevent the passage of filter media particles through the lower cover plates. Preferably, the slots are slightly tapered.

Upper orifices 48a and 48b are smaller than lower orifices 54a and 54b are positioned along an upper portion of upper recess walls 34a and 34b.

FIG. 2 deviates slightly from the illustration in FIG. 1 insofar as flange 26 is shown in FIG. 2 to have a staggered or offset portion 58 which defines, with a floor surface, a recess for matingly receiving the flange 28 of another modular underdrain in the filtration system.

The modular underdrain member described herein may be fabricated from any of a number of materials including, but not limited to, ABS plastic, PVC plastic, stainless steel, mild steel or aluminum.

Although the invention has been described in terms of particular embodiments and applications, one of ordinary skill in the art, in light of this teaching, can generate additional embodiments and modifications without departing from the spirit of or exceeding the scope of the claimed invention. For example, air or water distribution ports in the form of slots and flow equalization plenums in accordance with the present invention may be used in different underdrain configurations and still provide for an equalized backwash flow distribution. More specifically, slotted plates or small-volume equalization plenums may be used in horizontal walls of an underdrain rather than in inclined or vertical walls. Furthermore, upper orifices 48a and 48b, as well as lower orifices 54a and 54b, may have different sizes, interorifice spacings and different shapes, depending on the particular application. It is to be noted, in addition, that some applications will not require both an air distribution plenum and a water distribution plenum as disclosed herein.

Accordingly, it is to be understood that the drawings and descriptions herein are preferred by way of example to facilitate comprehension of the invention and should not be construed to limit the scope thereof.

What is claimed is:

1. A self-supporting underdrain member for use in a liquid filtration system, comprising:

a main body including a plurality of longitudinally extending side walls connected by an upper wall to define a chamber for guiding an effluent to an outlet during a filtering operation and a backwash fluid from a fluid source during a cleaning operation, at least one of said side walls being provided with a substantially longitudinally coextensive recess;

a cover plate attached to said one of said side walls over said recess to form a plenum at such wall, said one of said side walls being formed with a plurality of first orifices to establish communication between said chamber and said plenum, said cover plate being provided with a plurality of second orifices to establish communication between said plenum and a filter-medium-containing space overlying the underdrain member in the liquid filtration system; and attachment means for attaching said main body to a floor surface including a first flange and a second flange, said first flange defining a recess for matingly receiving the second flange of another underdrain in the filtration system.

2. The underdrain member defined in claim 1 wherein said second orifices comprise slots.

3. The underdrain member defined in claim 2 wherein said cover plate is an elongate member and said slots each extend transversely with respect to said cover plate.

4. The underdrain member defined in claim 2 wherein said slots are tapered.

5. The underdrain member defined in claim 2 wherein said slots are equispaced from each other.

6. The underdrain member defined in claim 2 wherein said slots are small enough to prevent the passage of filter media grains through said cover plate.

7. The underdrain member defined in claim 1 wherein said plurality of side walls includes two inclined walls, each of said inclined side walls being provided with a plurality of substantially parallel elongate recesses and a like plurality of elongate cover plates each attached to the respective inclined side wall over a respective one of the recesses to thereby form a plurality of elongate plenums at each of said inclined side walls, each of said inclined side walls being formed with a plurality of first orifices to establish communication between said chamber and the plenums in such inclined side wall, each of said cover plates being provided with a plurality of second orifices to establish communication between the respective plenum and a filter-medium-containing space of the liquid filtration system.

8. The underdrain member defined in claim 7 wherein said second orifices comprise slots.

9. The underdrain member defined in claim 7 wherein each of said inclined side walls is provided with an upper plenum for air distribution and a lower plenum for water distribution, said first orifices including relatively large orifices in communication with said lower plenum and relatively small orifices in communication with said upper plenum.

10. The underdrain member defined in claim 1 wherein said main body has an open side juxtaposable to a floor surface.

11. A self-supporting underdrain in a liquid filtration system, comprising:
   primary body means including a plurality of longitudinally extending side walls and an upper wall extending therebetween defining at least in part a chamber for guiding an effluent to an outlet during a filtering operation and a backwash fluid from a fluid source during a cleaning operation;
   secondary body means connected to said primary body means and having an interior wall in common with a side wall of said primary body means for defining a secondary chamber communicating via a plurality of orifices with said primary chamber, said orifices being disposed in said common wall of said primary body means and said secondary body means, said secondary body means being provided with a plurality of spaced slots in an exterior wall different from sand spaced from said common wall to enable backwash fluid entering said secondary chamber from said primary chamber to exit said secondary chamber to a filter-medium-containing space overlying the underdrain member in the liquid filtration system; and
   attachment means for attaching said primary body means to a floor surface including a first flange and a second flange, said first flange defining a recess for matingly receiving the second flange of another underdrain in the filtration system.

12. The underdrain member defined in claim 11, and further including said backwash fluid, which backwash fluid comprises air.

13. The underdrain member defined in claim 11, and further including said backwash fluid, which backwash fluid comprises water.

14. The underdrain member defined in claim 11 wherein said secondary body means exterior wall includes an elongate plate provided with said slots, said slots extending transversely with respect to said plate.

15. The underdrain defined in claim 11 wherein said slots are tapered.

16. The underdrain defined in claim 11 wherein said slots are equispaced.

17. The underdrain defined in claim 11 wherein said slots are small enough to prevent the passage of filter media grains into said secondary chamber.

18. The underdrain member defined in claim 11 wherein said common wall is provided with a recess, and said secondary body means and said exterior wall comprises an elongate plate provided with said slots and attached to said common wall to cover said recess and thereby form said secondary chamber.

19. The underdrain member defined in claim 11 wherein said plurality of side walls includes two inclined side walls, each of said inclined side walls being provided with a plurality of substantially parallel elongate recesses and a like plurality of elongate cover plates each attached to the respective inclined side wall over a respective one of the recesses to thereby form a plurality of elongate plenums at each of said inclined side walls, each of said inclined side walls being formed with a plurality of first ports to establish communication between said chamber and the plenums in such side inclined wall, each of said cover plates being provided with a plurality of second ports to establish communication between the respective plenum and a filter-medium-containing space of the liquid filtration system, said common wall comprising one of said inclined side walls, said secondary body means and said exterior wall comprising one of said cover plates, said orifices comprising some of said first ports and said slots comprising some of said second ports.

20. The underdrain defined in claim 11 wherein said primary body means has an open side juxtaposable to the floor surface.

21. A self-supporting underdrain member for use in a liquid filtration system, comprising:
   a main body having a plurality of walls defining at least in part an elongate primary chamber having a first volume for guiding an effluent to an outlet during a filtering operation and a backwash fluid from a fluid source during a cleaning operation;
   attachment means for attaching said main body to a floor surface including a first flange and a second flange, said first flange defining a recess for matingly receiving the second flange of another underdrain in the filtration system; and
   closure means connected to the side of said main body for defining along at least one of said walls a secondary chamber having a second volume substantially smaller than said first volume,
   said one of said walls being provided with a plurality of first orifices to enable communication between said primary chamber and said secondary chamber, said closure means being provided with a plurality of second orifices to enable communication between said secondary chamber and a filter-medium-containing space overlying the underdrain member in the liquid filtration system.

22. The underdrain member defined in claim 21 wherein said one of said walls is provided with a recess, said closure means taking the form of a plate member attached to said one of said walls over said recess to form said secondary chamber.

23. The underdrain member defined in claim 22 wherein said second orifices comprise slots.

24. The underdrain member defined in claim 23 wherein said slots are spaced from each other and extend parallel to each other.

25. The underdrain member defined in claim 24 wherein said plate member is elongate and said slots extend transversely with respect to said plate member.

26. The underdrain member defined in claim 24 wherein said slots are tapered.

27. The underdrain member defined in claim 23 wherein said slots are small enough to prevent the passage of filter media grains through said cover plate.

28. The underdrain member defined in claim 21 wherein said main body has an open side juxtaposable to the floor surface.

29. A self-supporting underdrain member for use in a liquid filtration system, comprising:

a main body including a pair of longitudinally extending inclined walls, a pair of generally triangular transverse walls connecting said inclined walls to one another, said inclined walls each being provided with a pair of longitudinally extending recesses and a plurality of orifices communicating with each of said recesses;

attachment means including a pair of flanges connected to said inclined walls for attaching said main body to a floor surface so that said inclined walls, said transverse walls and the floor surface define a cross-sectionally triangular chamber; and two pairs of elongate cover plates attached to said inclined walls over said recesses to form in each of said inclined walls a pair of longitudinally extending plenums, each of said cover plates being provided with a plurality of spaced slots.

30. The underdrain member defined in claim 29 wherein the recesses in each of said inclined walls are parallel to and spaced from one another, one recess in each of said inclined walls being an upper recess for air distribution and the other recess being a lower recess for water distribution.

31. The underdrain member defined in claim 29 wherein the orifices communicating with each said upper recess are smaller than the orifices communicating with each said lower recess.

32. The underdrain member defined in claim 29 wherein said orifices are spaced from each other longitudinally with respect to said recesses.

33. The underdrain member defined in claim 29 wherein said slots are spaced from each other longitudinally with respect to said recesses.

34. The underdrain member defined in claim 29 wherein said slots each extend transversely with respect to said cover plate.

35. The underdrain member defined in claim 29 wherein said slots are tapered.

36. The underdrain member defined in claim 29 wherein said slots are small enough to prevent the passage of filter media grains through said cover plate.

37. A self-supporting underdrain member for use in a liquid filtration system, comprising:

a main body including a plurality of walls defining at least in part a chamber for guiding an effluent to an outlet during a filtering operation and a backwash fluid from a fluid source during a cleaning operation, at least one of said walls being provided with a recess;

a cover plate attached to said one of said walls over said recess to form a plenum at such wall, said one of said walls being formed with a plurality of first orifices to establish communication between said chamber and said plenum, said cover plate being provided with a plurality of second orifices to establish communication between said plenum and a filter-medium-containing space overlying the underdrain member in the liquid filtration system; and means for attaching said main body to a floor surface including a first flange and a second flange, said first flange defining a recess for matingly receiving the second flange of another underdrain in the filtration system.

38. A self-supporting underdrain in a liquid filtration system, comprising:

primary body means including a plurality of walls defining at least in part a chamber for guiding an effluent to an outlet during a filtering operation and a backwash fluid from a fluid source during a cleaning operation;

secondary body means connected to said primary body means for defining a secondary chamber communicating via a plurality of orifices with said primary chamber, said orifices being disposed in said common wall of said primary body means and said secondary body means, said secondary body means being provided with a plurality of spaced slots in a second wall different from and spaced from said first wall to enable backwash fluid entering said secondary chamber from said primary chamber to exit said secondary chamber to a filter-medium-containing space overlying the underdrain member in the liquid filtration system; and means for attaching said primary body means to a floor surface including a first flange and a second flange, said first flange defining a recess for matingly receiving the second flange of another underdrain in the filtration system.

39. A self-supporting underdrain member for use in a liquid filtration system, comprising:

a main body having a plurality of walls defining at least in part an elongate primary chamber having a first volume for guiding an effluent to an outlet during a filtering operation and a backwash fluid from a fluid source during a cleaning operation;

closure means connected to said main body for defining along at least one of said walls a secondary chamber having a second volume substantially smaller than said first volume, said one of said walls being provided with a plurality of first orifices to enable communication between said primary chamber and said secondary chamber, said closure means being provided with a plurality of second orifices to enable communication between said secondary chamber and a filter-medium-containing space overlying the underdrain member in the liquid filtration system; and means for attaching said main body to a floor surface including a first flange and a second flange, said first flange defining a recess for matingly receiving the second flange of another underdrain in the filtration system.

* * * * *

UNITED STATES PATENT AND TRADEMARK OFFICE
CERTIFICATE OF CORRECTION

PATENT NO. : 5,332,497

DATED : 7/26/94

INVENTOR(S) : Edward M. Shea et al.

It is certified that error appears in the above-indentified patent and that said Letters Patent is hereby corrected as shown below:

In the Abstract, line 17, change the period to a comma and "Each" to --each--;

In Column 1, line 52, after "invention" insert --is--;

In Column 2, line 1, after "as" (second occurrence), insert --air--;

In Column 2, line 13, after "member" insert --in--;

In Column 2, line 34, after "sand" change "though" to --through--;

In Column 3, line 5, change "back-wash" to --backwash--;

In Column 3, line 27, change "though" to --through--;

In Column 4, line 4, change "back-wash" to --backwash--;

In Column 4, line 33, change "DRAWING" to --DRAWINGS--;

In Column 4, line 65, change "back-wash" to --backwash--;

In Column 5, line 49, after "54b" insert --and--;

In Column 6, line 13, change "preferred" to --proffered--;

In Column 7, line 32, change "sand" to --and--;

In Column 7, line 43, delete "member";

In Column 7, line 46, delete "member";

UNITED STATES PATENT AND TRADEMARK OFFICE
CERTIFICATE OF CORRECTION

PATENT NO. : 5,332,497
DATED : 7/26/94
INVENTOR(S) : Edward M. Shea et al.

It is certified that error appears in the above-indentified patent and that said Letters Patent is hereby corrected as shown below:

In Column 7, line 49, delete "member";

In Column 7, line 60, delete "member";

In Column 7, line 66, delete "member"; and

In Column 10, line 19, delete "said common wall" and insert --a first wall of--

Signed and Sealed this

Twenty-second Day of November, 1994

Attest:

BRUCE LEHMAN

Attesting Officer   Commissioner of Patents and Trademarks